(12) United States Patent
Sternby

(10) Patent No.: US 7,865,016 B2
(45) Date of Patent: Jan. 4, 2011

(54) METHOD FOR ADDITIVE CHARACTER RECOGNITION AND AN APPARATUS THEREOF

(75) Inventor: Jakob Sternby, Lund (SE)

(73) Assignee: Zi Decuma AB, Lund (SE)

( * ) Notice: Subject to any disclaimer, the term of this patent is extended or adjusted under 35 U.S.C. 154(b) by 981 days.

(21) Appl. No.: 11/680,582

(22) Filed: Feb. 28, 2007

(65) Prior Publication Data

US 2007/0206859 A1 Sep. 6, 2007

Related U.S. Application Data

(60) Provisional application No. 60/778,022, filed on Mar. 1, 2006.

(51) Int. Cl.
*G06K 9/00* (2006.01)
(52) U.S. Cl. .............. 382/178; 382/179; 382/186; 382/189
(58) Field of Classification Search ........... 382/186
See application file for complete search history.

(56) References Cited

U.S. PATENT DOCUMENTS

| 4,653,107 | A | * | 3/1987 | Shojima et al. ............ 382/189 |
| 5,878,164 | A | | 3/1999 | Brown et al. |
| 6,243,493 | B1 | | 6/2001 | Brown et al. |
| 2002/0196978 | A1 | * | 12/2002 | Hawkins et al. ............ 382/189 |

2005/0100214 A1 5/2005 Zhang et al.

FOREIGN PATENT DOCUMENTS

WO WO 02/37933 A2 5/2002

OTHER PUBLICATIONS

Moises Pastor et al., Writing Speed Normalization for On-Line Handwritten Text Recognition, Proceedings of the 2005 Eight International Conference on Document Analysis and Recognition, IEE Computer Society, 2005, pp. 1-5.*
Sternby, J.; Frame Deformation Energy Matching of On-Line Handwritten Characters; Progress in Pattern Recognition, Image Analysis and Applications; 10th Iberoamerican Congress on Pattern Recognition; 2005; p. 128-137; Springer Berlin/Heidelberg.

(Continued)

*Primary Examiner*—Brian P Werner
(74) *Attorney, Agent, or Firm*—Michael A. Glenn; Glenn Patent Group

(57) ABSTRACT

A method for recognition of a handwritten pattern comprising one or more curves is presented. The method comprises a step of receiving sample data representing the handwritten pattern. The method further comprises a step of segmenting the handwritten pattern by detecting segmentation points on each curve, and by dividing the handwritten pattern into segments. Further, the method comprises a step of comparing the handwritten pattern to templates wherein the comparing comprises a step of normalizing said segments according to a scheme which is independent of the templates to which the segments are to be compared, and a step of determining matching measures for selecting at least one sequence of templates representing a recognintion candidate of the handwritten pattern.

32 Claims, 6 Drawing Sheets

OTHER PUBLICATIONS

Sternby, J.; Structurally Based Template Matching of On-Line Handwritten Characters; Jan. 4, 2006; Retrieved from the Internet.

Sternby, J.; An Additive On-Line Single Character Recognition Method; Tenth International Workshop On Frontiers In Handwriting Recognition; LaBaule; Oct. 23, 2006; Retrieved from the Internet.

Powalka, R.K.; "An algorithm toolbox for on-line cursive script recognition"; May 1995; retrieved on Feb. 9, 2002 from website: http://citeseer.nj.nec.com/rd/70348799%2C209471%2C0.25%2CDowload/http:;//citeseer.nj.nec.com/compress/0/papers/cs/8855/http:zSzzSzwww.doc.ntu.ac.ukzSz{inkdtazSrkpzSztheseis.main.ps.gz/an-algorith.

* cited by examiner

METHOD FOR ADDITIVE CHARACTER RECOGNITION AND AN APPARATUS THEREOF

CROSS-REFERENCE TO RELATED APPLICATION

This application claims the benefit of priority to U.S. provisional patent application Ser. No. 60/778,022, filed on Mar. 1, 2006.

TECHNICAL FIELD

The present invention relates to a method for recognition of a handwritten pattern comprising one or more curves, as well as a module, an apparatus and a computer program thereof.

BACKGROUND OF THE INVENTION

The recognition of handwriting is today in many aspects a mature research area with several industrial applications. It has become an increasingly popular method for inputting data to data handling units, such as mobile phones and Personal Digital Assistants (PDAs). The recognition method is in most cases limited to recognition of single isolated characters, as for example by Graffiti®, manufactured by Palm, Inc.

When it comes to on-line cursive word recognition progress has been much slower. Most such methods of today utilize Neural Networks and statistical models based on Hidden Markov Models. However, extending the task to recognition of cursive words introduces a difficult layer of complexity in the form of segmentation.

SUMMARY

The invention may be used to solve or at least reduce the problems discussed above. In particular, the invention may be used to interpret a handwritten pattern representing one or more symbols.

The invention may be embodied as a method for recognition of a handwritten pattern comprising one or more curves, said method comprising receiving sample data representing the handwritten pattern, segmenting the handwritten pattern by detecting segmentation points on each curve, and by dividing the handwritten pattern into segments, and comparing the handwritten pattern to templates wherein the comparing comprises normalizing said segments according to a scheme which is independent of the templates to which the segments are to be compared, and determining matching measures for selecting at least one sequence of templates representing a recognintion candidate of the handwritten pattern.

An advantage of this is that a single character recognition method may be extended to treat cursive word recognition.

Further, the matching measures may include segmental matching measures comparing segmental features of the handwritten pattern to segmental features of the templates, which means that the matching process may be made more efficiently.

Further, the matching measures may include connective matching measures comparing connective features between segments in the handwritten pattern to connective features of templates, which also means that the matching process may be made more efficiently.

The method may include a step of compensating for translation, angle or length differences (or any combination of these) between the segments such that the segmental features are relative within each possible segment, which may be advantegous in that the features may be treated in a similar way regardless of which template they are compared to.

The method may include a step of compensating for translation, angle or length differences (or any combination of these) between the segments such that the connective features are relative between the adjacent segments, which may be advantegous in that the features may be treated in a similar way regardless of which template they are compared to.

The segmental features may include a segmental distance between two segments or a distance component between two pairs of attached segments, which may be advantegous in that functional variables may be used.

The connective features may include a distance component for non-connected segments or a distance component for a connection between two segments, which may be advantegous in that functional variables may be used.

The step of determining matching measures may utilize an operator in order to determine the connection of templates that are to be used as a model for comparison with the connections between segments, which may be advantegous in that the functional variables may be used by the operator.

The operator may be a linear function of the segmental distance between two segments and the distance component for a connection between two segments, which may be advantegous in that the operator may be simple.

The method may include a step of detecting the segmentation points as local extreme points which are below a predetermined threshold, which may be advantegous in that a segmentation frame may be created in a simple way.

The method may include a step of parameterizing each segment by the Dijkstra Curve Maximization strategy with three intermittent points, which may be advantegous in that the resulting curve length may be maximized.

The step of comparing may utilize point-to-curve matching, which may be advantegous in that the method allows unevenly spaced points.

The method may include a step of associating an output weight to normalized segmental and connective features, which may be advantegous in that that the features may be balanced in an efficient way.

The invention may be embodied as a module for recognition of a handwritten pattern comprising one or more curves, said module comprising a receiver configured to receive sample data representing the handwritten pattern, a segmentation point detector configured to detect segmentation points on each curve, a divider configured to divide the handwritten pattern into segments, normalizer configured to normalize said segments according to a scheme which is independent of the templates to which the segments are to be compared, a determinator configured to determine matching measures for selecting at least one sequence of templates representing a recognintion candidate of the handwritten pattern, and a transmitter configured to output said matching templates.

The advantages of the first embodiment of the invention are also applicabe for this second embodiment of the invention.

The determinator may be configured to determine segmental matching measures.

The determinator may be configured to determine connective matching measures.

The module may inlcude a compensator configured to compensate for translation, angle or length differences (or any combination of these) between the segments such that the segmental features are relative within each possible segment.

The module may include a compensator configured to compensate for translation, angle or length differences (or any combination of these) between the segments such that the connective features are relative between the adjacent segments.

The determinator may be configured to determine a segmental distance between two segments or a distance component between two pairs of attached segments.

The determinator may be configured to determine a distance component for non-connected segments or a distance component for a connection between two segments.

The determinator may utilize an operator in order to determine the connection of templates that are to be used as a model for comparison with the connections between segments.

The operator may be a linear function of the segmental distance between two segments and the distance component for a connection between two segments.

The segmental point detector may be configured to detect the segmentation points as local extreme points which are below a predetermined threshold.

The segmental point detector may be configured to parameterize each segment by the Dijkstra Curve Maximization strategy with three intermittent points.

The determinator may be configured to utilize point-to-curve matching.

The module may include an associator configured to associate an output weight to every normalized segmental and connective feature.

The invention may be embodied as an apparatus comprising a pen movement capturing device configured to receive data representing a handwritten pattern, a module (like that described above) configured to receive said data from said pen movement capturing device and to output matching templates, a symbol matcher configured to match said templates into symbols, and a display configured to present said symbols.

The advantages of the first embodiment of the invention are also applicabe for this third embodiment of the invention.

The pen movement capturing device may be a touch sensitive surface.

The apparatus may include a symbol set database comprising a number of reference template combinations and their associated symbols.

The claimed subject matter may be embodied as computational device configured for receiving from a network and storing a set of instructions to cause the computational device to run logical steps of an aspect of the invention.

Other objectives, features and advantages of the present invention will appear from the following detailed disclosure, from the attached claims, and from the drawings.

Generally, all terms used in the claims are to be interpreted according to their ordinary meaning in the technical field, unless explicitly defined otherwise herein. All refernces to "a/an/the [element, device, component, means, step, etc]" are to be interpreted openly as referring to at least one instance of said element, device, component, means, step, etc., unless expicitly stated otherwise. The steps of any method disclosed herein do not have to be performed in the exact order disclosed, unless explicitly stated.

As used herein, a symbol is any form that has a specific meaning, such as a character (e.g. Latin, Chinese or other kind), a ligature between, before or after characters, a number, a punctuation mark, or a diacritic mark.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
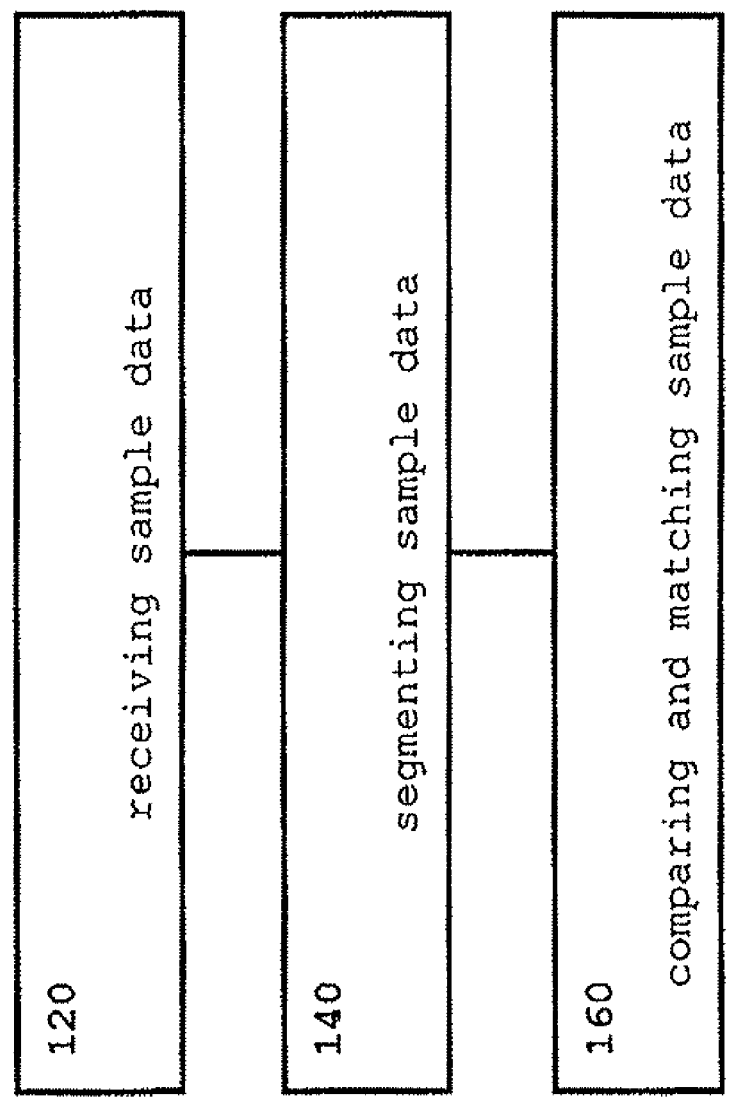
FIG. 1 generally illustrates a general principle of the present invention.

FIG. 1 illustrates a general principle of the present invention, which is known from J. Sternby. *An Additive On-Line Single Character Recognition method. In Tenth International Workshop on Frontiers in Handwriting Recognition*, La Baule, France, 2006, and hereby incorporated by reference. A method 100 for recognition of a handwritten pattern 124 may include several steps, each step represented by a box in the figure. At step 120, sample data 122 representing a handwritten pattern 124 is received. The handwritten pattern 124 is segmented into several segments 126 at step 140, and at step 160 the segments 126 are compared and matched to templates 128.

The sample data 122 may be any type of digital data representing a handwritten pattern 124 comprising one or more curves 130. The handwritten pattern 124 may form one or several symbols. The templates 128 are each representing a symbol or a part of a symbol.

Figure 2:
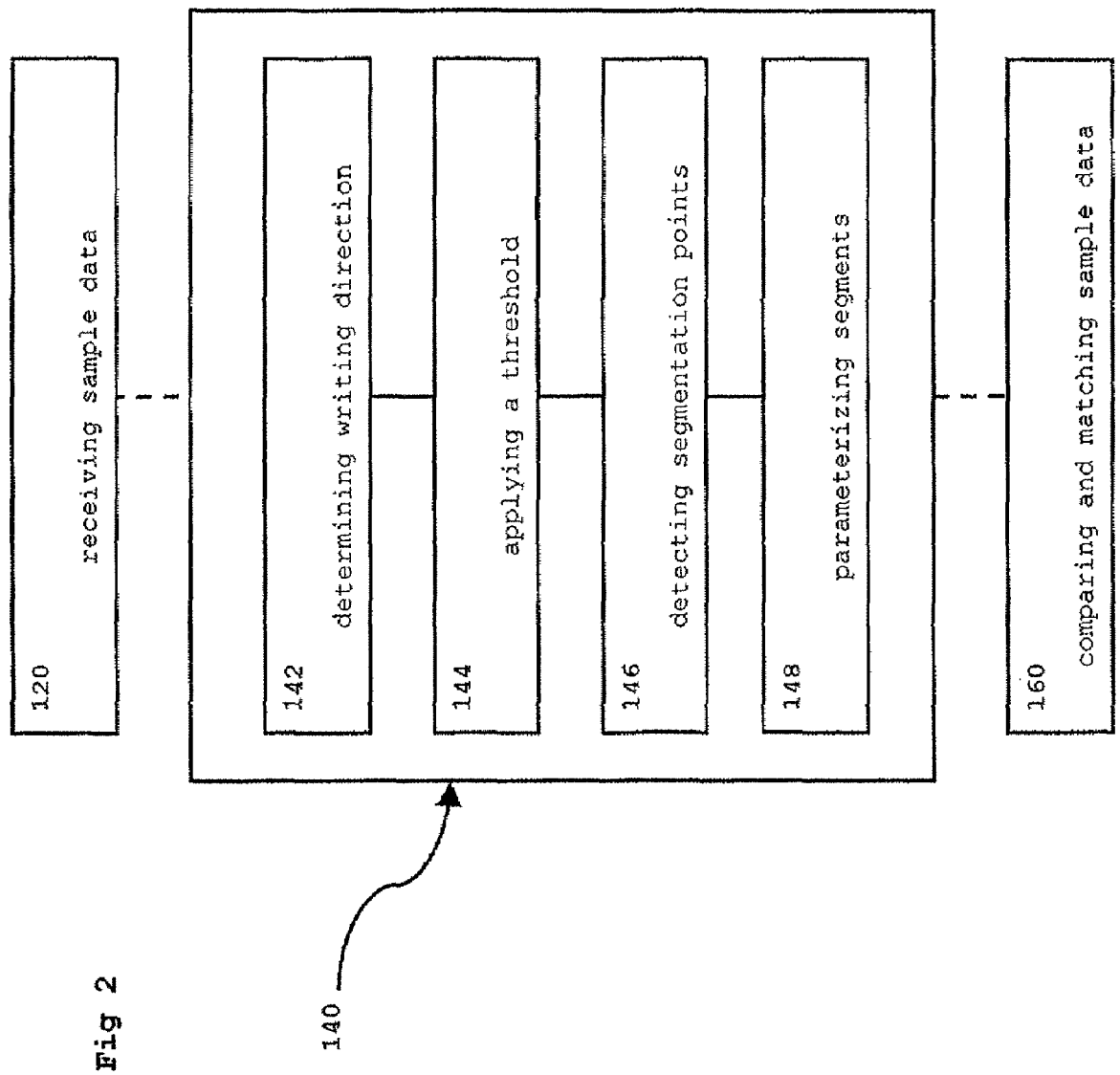
FIG. 2 generally illustrates the segmentation of sample data in further detail.
Figure 4A:
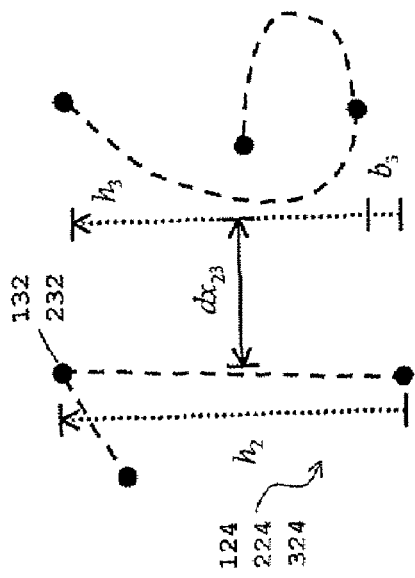
FIG. 4a generally illustrates an example of a handwritten pattern with indicated segmentation points.
Figure 4B:
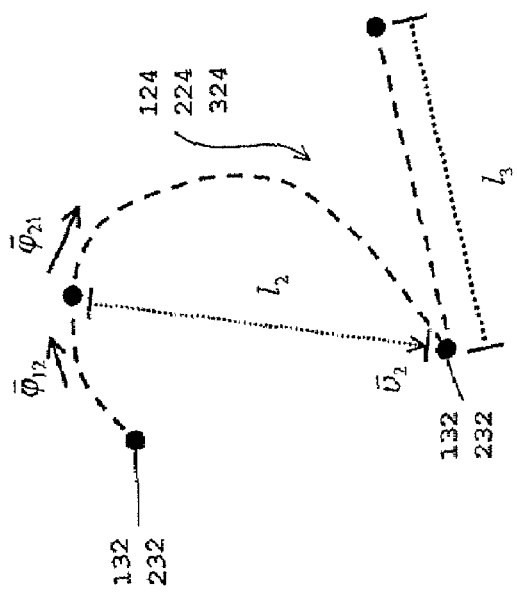
FIG. 4b generally illustrates a second example of a handwritten pattern with indicated segmentation points.
Figure 4C:
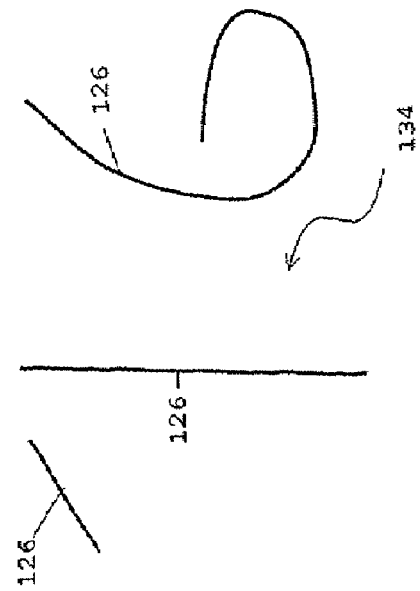
FIG. 4c generally illustrates the handwritten pattern illustrated in FIG. 4a divided into segments.
Figure 4D:
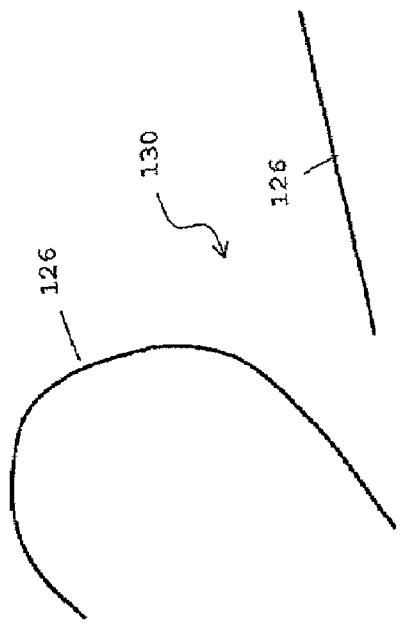
FIG. 4d generally illustrates the handwritten pattern illustrated in FIG. 4b divided into segments.

FIG. 2 illustrates the segmenting step 140 in more detail. Considering the received sample data 122 as input data, a step 142 is performed for determining the writing direction of the handwrittern pattern 124. Such determining step 142 may include a successive order of calculations or simply a validation of a default setting. By performing a step 144, a threshold is applied to the sample data 122. From this, segmentation points 132 may be detected at step 146. The segmentation points 132 may be placed on a curve as the local extreme points below the applied threshold, such that a gradient function of the curve in the local extreme points is exceeded. So far, the frame/segmentation 134 of the sample data 122 is produced by the steps 142, 144 and 146. An example of such segmentation is illustrated in FIGS. 4c and 4d. A parameterizing step 148 may then be performed by executing the Djikstra Curve Maximisation strategy with three intermittent points, so that the segmentation points 132 are detected and placed on the curve 130 in such a way that the resulting curve length is maximized.

Figure 3:
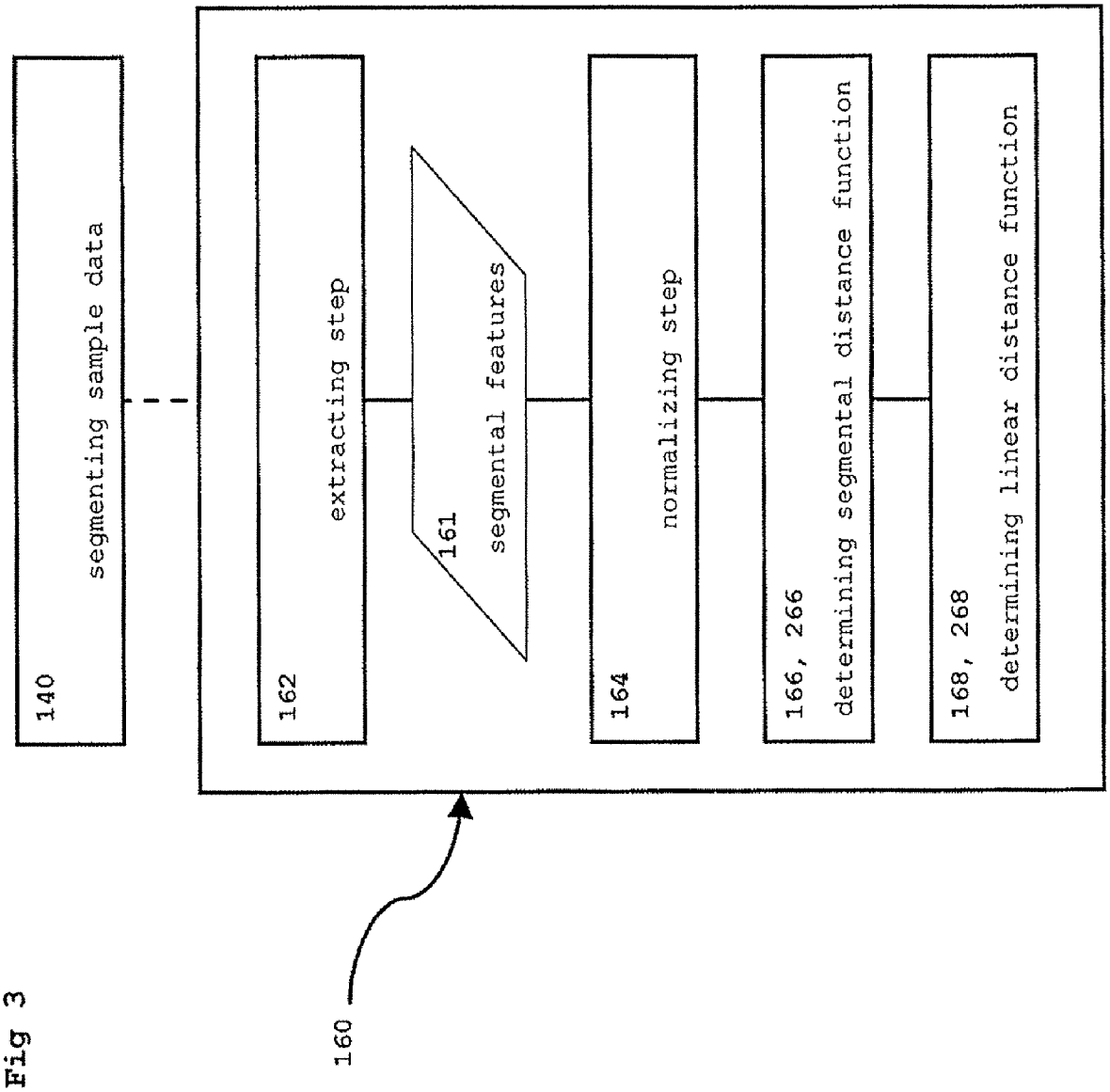
FIG. 3 generally illustrates the comparing and matching of sample data in further detail.

FIG. 3 illustrates the comparing and matching step 160. Here, an extracting step 162 may be performed, during which step segmental features 161 may be extracted. In this step 162, a direction a(s) is calculated for each segment 126. In this step 162, each subsequent pair of connected segments 126 also generates a length ratio λ and a connection angle φ. For non-connected subsequent segments 126, the length ratio λ is calculated as well as a vertical position κ and a segment gap δ. In another step 164 within the comparing and matching step 160, the extracted features 161 are normalized, resulting in a normalized direction a(s), a normalized length ratio λ, a normalized connection angle φ, a normalized vertical position κ and a normalized segment gap δ. With reference to FIGS. 4a and 4b, the normalized direction a(s) is defined as $$\alpha_j = \arg(\vec{v}_j), \alpha_j \in [0, 2\pi],$$

the normalized length ratio λ is defined as $$\lambda(s_j, s_{j+1}) = \begin{cases} \dfrac{l_j}{l_{j+1}}, & \text{if } l_{j+1} \geq l_j \\ 2 - \dfrac{l_{j+1}}{l_j}, & \text{else} \end{cases},$$

the normalized connection angle φ is defined as $$\phi(s_j, s_{j+1}) = \arg(\vec{\phi}_{j(j+1)}) - \arg(\vec{\phi}_{j(j+1)}) \bmod 2\pi,$$

the normalized vertical position κ is defined as $$\kappa(s_j, s_{j+1}) = \begin{cases} \dfrac{(h_{j+1} + b_{j+1})/2 - b_j}{h_j - b_j}, & \text{if } \dfrac{(h_{j+1} + b_{j+1})/2 - b_j}{h_j - b_j} \in [0,1] \\ 0, & \text{if } \dfrac{(h_{j+1} + b_{j+1})/2 - b_j}{h_j - b_j} < 0 \\ 1, & \text{else} \end{cases},$$

and the normalized segment gap δ is defined as $$\delta(s_j, s_{j+1}) = \begin{cases} \dfrac{dx_{j(j+1)}}{2(h_j - b_j)}, & \text{if } h_j - b_j \geq |dx_{j(j+1)}| \\ \text{sign}(dx_{j(j+1)}) - \dfrac{h_j - b_j}{2 \cdot dx_{j(j+1)}}, & \text{else} \end{cases}$$

Again referring to FIG. 3, in a further step 166 a segmental curve distance function $d_{DCM}$ is constructed in order to deal with the specific issues of discriminating between handwritten curves. Since translation, angle and length differences between the segments 126 have been removed due to the normalizing step 164, the segmental curve distance function $d_{DCM}$ is measuring the distance between two curve segments aligned, so that the two segments 126 share start and end points. The segmental curve distance function $d_{DCM}$ is a dynamic time warping influenced distance function made to discriminate well between curves 130 parameterized according to step 148. The points 132 placed during the step 148 are spaced unevenly on the curve, due to the fact that the method focuses on retaining the shape information and not on providing a smooth parameterization. For this reason, the segmental curve distance function $d_{DCM}$ allows point-to-curve matching in addition to traditional point-to-point matching. Furthermore, as the number of placed points are few compared to traditional arclength parameterizations, the directional vector used in the prior art is not a stable feature.

The segmental curve distance function $d_{DCM}$ can be defined as $$d_{DCM}(P, Q) = \min_\Phi \sum_{i=1}^m g(p_{\phi_p(i)}, q_{\phi_p(i)})$$

where P and Q denote two different samples of a handwritten pattern, Φ is an alignment function of the normalized connection angles p and normalization constants for balancing the angle distance with coordinate distance, and g is a basic distance function between two points p and q. This basic distance function g includes a weight function f in order to improve the fact that the matching of handwritten patterns suffers from over-fitting of the templates to the samples. This weight function f also considers the situation when the points differ. The weight function f can be defined as $$f(x) = 0.2x^2 - 1.1x + 1, x \in [0,1]$$

and can be applied according to the minimal Euclidian distance of the point pair (x, y) to their common baseline defined by the start and end points. By defining the baseline as $$b(t) = p_1 + \vec{v}t, \vec{v} = p_n - p_1$$

and having defined $v_{x,y} = \arg \min_{v \in \{x,y\}} d_1(b, v)$, where $d_1$ is the orthogonal distance between the point u and the line b, the basic distance function then equals $$g_{DCM}(x,y) = f(\min(v_{x,y}, \|p_n - p_1\|)) \cdot (\|x - y\|^2 + \kappa_\theta \|\theta_x - \theta_y\|^2).$$

The complete algorithm between two samples $P = \{p_j\}_{j=1}^n$ and $Q = \{q_j\}_{j=1}^n$ can then be formulated as:

$$\begin{aligned}
&\text{for } i, j := 1, \ldots, n \text{ do} \\
&\quad \text{if } i < n \text{ then} \\
&\qquad d(i_\xi, j) := g(x_{i,j}^{P,Q}, q_j) + \min \begin{cases} d(i, j-1) \\ d(i_\xi, j-1) \end{cases} \\
&\quad \text{end if} \\
&\quad \text{if } j < n \text{ then} \\
&\qquad d(i, j_\xi) := g(p_i, x_{j,i}^{Q,P}) + \min \begin{cases} d(i-1, j) \\ d(i-1, j_\xi) \end{cases} \\
&\quad \text{end if} \\
&\quad d(i, j) := \min \begin{cases} d(i-1, j) + g(p_i, q_j) \\ d(i-1, (j-1)_\xi) + g(p_i, q_j) \\ d(i, j-1) + g(p_i, q_j) \\ d((i-1)_\xi, j-1) + g(p_i, q_j) \\ d(i-1, j-1) + 2g(p_i, q_j) \end{cases} \\
&\text{end for} \\
&d_{DCM}(P, Q) := d(n, n)/2n
\end{aligned}$$

Now referring to FIG. 3, the step 168 is performed in order to determine a linear distance function $d_{FDE}$ of features 161. The linear distance function $d_{FDE}$ is utilized in order to treat segments in an additive way and thereby bring out the additive property of the character recognition method 100. The features 161 are divided into a segmental and a connective feature component $d_s$ and $d_c$, respectively. The segmental component $d_s$ compares two segments 126, and the connective component $d_c$ compares the connection between two pairs of segments 126. The segmental distance component between two segments $(s_1, s_2)$ may be defined as $$d_s(s_1, s_2) = \omega_A |\alpha(s_1) - \alpha(s_2)| + \omega_P d_{DCM}(A_{12}(s_1), A_{21}(s_2)),$$

where one of the operators $A_{12}$, $A_{21}$ is the identity operator and the other operator aligns the start and end point of the smaller segment to the longer segment.

A distance component $d_A$ between two pairs of attached segments $(s_{11}, s_{12})$, $(s_{21}, s_{22})$ may be similarly defined as $$d_A((s_{11}, s_{12}), (s_{21}, s_{22})) = \omega_L |\lambda(s_{11}, s_{12}) - \lambda(s_{21}, s_{22})| + \omega_C |\phi(s_{11}, s_{12}) - \phi(s_{21}, s_{22})|.$$

Further, a distance component $d_N$ for non-connected segments may be derived from the normalized length ratio $\lambda$, the normalized vertical position $\kappa$ and the normalized segment gap $\delta$, as $$d_N((s_{11}, s_{12}), (s_{21}, s_{22})) = \omega_L |\lambda(s_{11}, s_{12}) - \lambda(s_{21}, s_{22})| + \omega_V |\kappa(s_{11}, s_{12}) - \kappa(s_{21}, s_{22})| + \omega_G |\delta(s_{11}, s_{12}) - \delta(s_{21}, s_{22})|.$$

The distance connective component $d_c$ for a connection between two segments can then be defined as $$d_C(\cdot, \cdot) = \begin{cases} d_A(\cdot, \cdot) & \text{if segments are connected} \\ d_N(\cdot, \cdot) & \text{else} \end{cases}$$

The total additive distance function $d_{FDE}$ between two samples with segmentations $S(X) = \{s_i^x\}_{i=1}^{|S(X)|}$ and $S(Y) = \{s_j^y\}_{j=1}^{|S(Y)|}$ such that $S(X) \sim S(Y)$ can then be stated as $$d_{FDE}(X, Y) = \sum_{i=1}^{|S(X)|} d_S(s_i^X, s_i^Y) + \sum_{i=1}^{|S(X)|-1} d_C((s_i^X, s_{i+1}^X), (s_i^Y, s_{i+1}^Y)).$$

The additive distance function $d_{FDE}$ is dependent on the weights $\omega_A, \omega_P, \omega_L, \omega_V$ and $\omega_G$, which in this embodiment are set to a predetermined value. The balancing of these weights may be done due to the differentiating of the distance function $d_{FDE}$ into separate features 161. In one embodiment, this can be done by viewing the weights as a hyperplane and determining this hyperplane by a support vector machine. An initial value for all weights can be obtained by producing one positive element and one negative set of distance components for each sample 122. The positive element can be obtained as the set of distance components between a sample and the cluster center which the sample belonged to and correspondingly the negative element can be obtained as the distance components between the sample and a neighbouring class. Further, the initial estimation of the weights can be obtained as the hyperplane obtained through a LinearSVC, which is a function that constructs a linear SVM classifier, as implemented in an osu-svm package, such as the OSU SVM Classifier Matlab Toolbox (ver. 3.00) by Ma et al. Using a linear distance function with weights, it is possible to define secondary zoom functions to further differentiate in recognition between top candidates in the recognition output.

A segment 126 of a handwrittern pattern 124 may correspond to a sequence of possible segmentation points 132 from a first segmentation point to a second segmentation point. The segment 126 may thus include one or more subsegments between adjacent intermediate segmentation points arranged in between the first and second segmentation points. The relative features of a segment 126 may be determined by comparing features 161 of adjacent sub-segments.

This implies that a handwritten pattern 124 representing several symbols may be quickly recognized. By using the possible segmentation points both for segmentation and for determining features 161 to be used in recognition of the handwritten pattern 124, the calculations will similtaneously separate the handwritten pattern 124 and match the pattern 124 with templates 128. Thereby, the process of comparing of the handwritten pattern is very quick.

After all segmentation points have been analyzed, cumulative matching measures may be assigned to the last segmentation point and may be associated with sequences of templates 128 that have been matched with the handwritten pattern 124. Thus, the information assigned to the last segmentation point could be used for obtaining possible recognition results of the handwritten pattern 124.

Figure 5:
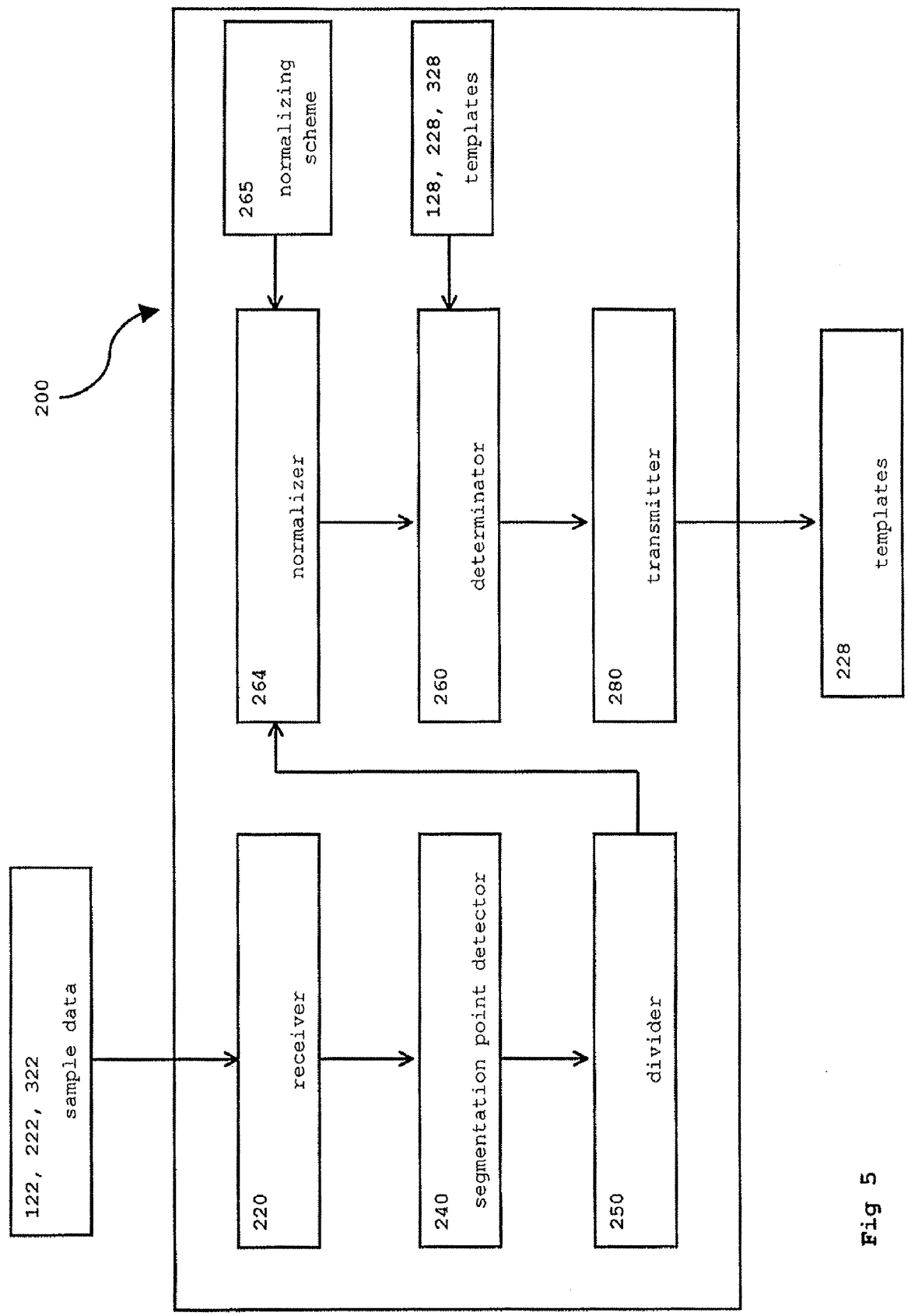
FIG. 5 schematically illustrates a module according to the present invention.

A module 200 according to the present invention is illustrated in FIG. 5. The module may be a hardware implemented module or a combination of a hardware implemented module and a software implemented module, such as an ASIC ("Application-specific Integrated Circuit").

Sample data 222 representing a handwritten pattern 224, which may include one or more curves, may be received by a receiver 220 included within the module 200. The received sample data is thereafter transferred to a segmentation point detector 240, wherein segmentation points 232 are detected on each curve.

Next, a divider 250 divides the handwritten pattern into segments 226 and a normalizer 264 normalizes said segments 226 according to a scheme 265. Said normalizer 264 may be of any suitable type, preferably a processor. Said scheme 265 is independent of which sample 222 is to be normalized by the normalizer 264.

Further, a determinator 260 may be configured to determine specific matching measures 266, 268 for selecting at least one sequence of templates 228 representing a recognition candidate of the handwritten pattern 224.

Finally, the selected sequence of templates 228 can be output from the module 200 by means of a transmitter 280.

The receiver 220 may be any known apparatus suitable for receiving data represented by any form, for example a voltage, a current, an optical signal, a magnetic signal or the like.

The transmitter 280 may be any known apparatus suitable for transmitting data represented by any form, for example a voltage, a current, an optical signal, a magnetic signal or the like.

Figure 6:
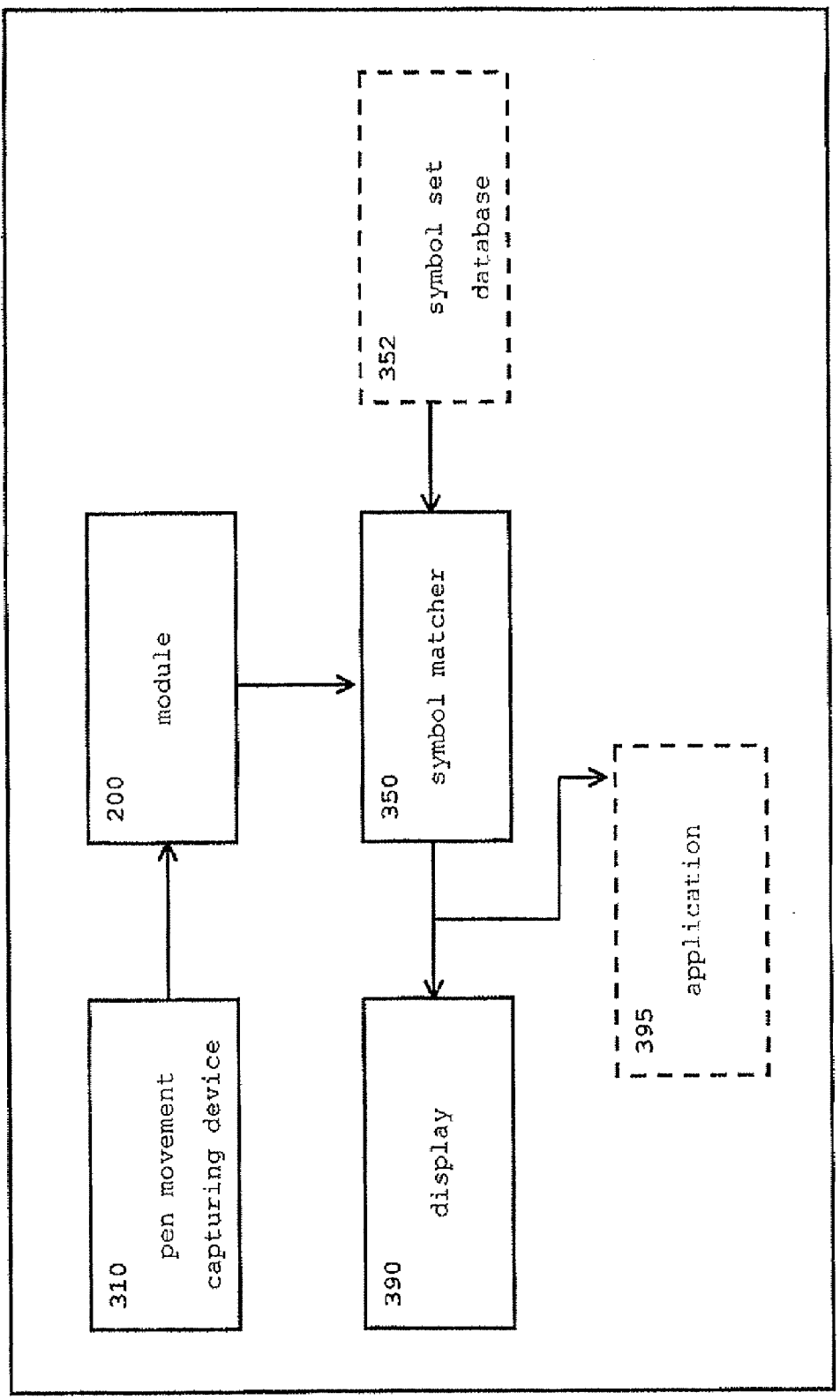
FIG. 6 schematically illustrates an apparatus according to the present invention.

An apparatus 300 according to the present invention is illustrated in FIG. 6. The apparatus may be a communication terminal, such as a PDA ("Personal Digital Assistant"), a mobile phone or any other data handling device.

The apparatus 300 may include a pen movement capturing device 310, such as a touch sensitive surface, configured for receiving sample data 322 representing a handwritten pattern 324. The sample data 322 received via the pen movement capturing device 310 can be transferred to the module 200, as described above.

The reference templates 328 which are output from the module 200 can be transferred to a symbol matcher 350, which, in association with a symbol set database 352, can be configured to match a number of output reference templates to a symbol set.

When having found the symbol set, the corresponding symbol may be shown to the user on a display 390.

If the pen movement capturing device 310 is embodied as a touch sensitive surface, the touch sensitive surface may be combined with the display 390 of the apparatus. Further, the symbol set may be transferred to an application 395, such as a messaging software application.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computer implemented method for recognition of a handwritten pattern comprising one or more curves, said method comprising:
receiving, by a computational device, sample data representing the handwritten pattern;
segmenting, by the computational device, the handwritten pattern by detecting segmentation points on each curve and by dividing the handwritten pattern into segments, wherein detecting segmentation points further comprises detecting the segmentation points as local extreme points which are below a predetermined threshold, such that a particular gradient function of the curve is exceeded; and
comparing, by the computational device, the handwritten pattern to templates wherein the comparing comprises:
normalizing, by the computational device, said segments according to a scheme which is independent of the templates to which the segments are to be compared, and
determining, by the computational device, matching measures for selecting at least one sequence of templates representing a recognition candidate of the handwritten pattern.

2. The computer implemented method according to claim 1, wherein said matching measures comprise segmental matching measures comparing segmental features of the handwritten pattern to segmental features of the templates.

3. The computer implemented method according to claim 2, further comprising a step of compensating, by the computational device, for translation, angle or length differences between the segments such that the segmental features are relative within each possible segment.

4. The computer implemented method according to claim 2, wherein said segmental features comprise a segmental distance between two segments.

5. The computer implemented method according to claim 2, wherein said segmental features comprise a distance component between two pairs of attached segments.

6. The computer implemented method according to claim 1, wherein said matching measures comprise connective matching measures comparing connective features between segments in the handwritten pattern to connective features of templates.

7. The computer implemented method according to claim 6, further comprising a step of compensating, by the computational device, for translation, angle or length differences between the segments such that the connective features are relative between the adjacent segments.

8. The computer implemented method according to claim 6, wherein said connective features comprise a distance component for non-connected segments.

9. The computer implemented method according to claim 6, wherein said connective features comprise a distance component for a connection between two segments.

10. The computer implemented method according to claim 4, 5, 8 or 9 wherein said step of determining, by the computational device, matching measures utilizes an operator in order to determine the connection of templates that are to be used as a model for comparison with the connections between segments.

11. The computer implemented method according to claim 10, wherein said operator is a linear function of the segmental distance between two segments and the distance component for a connection between two segments.

12. The computer implemented method according to claim 10, further comprising a step of parameterizing, by the computational device, each segment by the Dijkstra Curve Maximization strategy with three intermittent points.

13. The computer implemented method according to claim 1, wherein said step of comparing, by the computational device, utilizes point-to-curve matching.

14. The computer implemented method according to claim 1, further comprising a step of associating, by the computational device, an output weight to normalized segmental and connective features.

15. A computational device having a database for recognition of a handwritten pattern comprising one or more curves, said computational device comprising:
a receiver configured to receive sample data representing the handwritten pattern;
a segmentation point detector configured to detect segmentation points on each curve, wherein said segmentation point detector is further configured to detect the segmentation points as local extreme points which are below a predetermined threshold, such that a particular gradient function of the curve is exceeded;
a divider configured to divide the handwritten pattern into segments;
a normalizer configured to normalize said segments according to a scheme which is independent of the templates to which the segments are to be compared;
a determinator configured to determine matching measures for selecting at least one sequence of templates representing a recognition candidate of the handwritten pattern; and
a transmitter configured to output said matching templates.

16. The computational device according to claim 15, wherein said determinator is configured to determine segmental matching measures.

17. The computational device according to claim 16, further comprising a compensator configured to compensate for translation, angle or length differences between the segments such that the segmental features are relative within each possible segment.

18. The computational device according to claim 16, wherein said determinator is configured to determine a segmental distance between two segments.

19. The computational device according to claim 16, wherein said determinator is configured to determine a distance component between two pairs of attached segments.

20. The computational device according to claim 15, wherein said determinator is configured to determine connective matching measures.

21. The computational device according to claim 20, further comprising a compensator configured to compensate for translation, angle or length differences between the segments such that the connective features are relative between the adjacent segments.

22. The computational device according to claim 20, wherein said determinator is configured to determine a distance component for non-connected segments.

23. The computational device according to claim 20, wherein said determinator is configured to determine a distance component for a connection between two segments.

24. The computational device according to claim 18, 19, 22 or 23 wherein said determinator utilizes an operator in order to determine the connection of templates that are to be used as a model for comparison with the connections between segments.

25. The computational device according to claim 24, wherein said operator is a linear function of the segmental distance between two segments and the distance component for a connection between two segments.

26. The computational device according to claim 24, wherein said segmental point detector is configured to parameterize each segment by the Dijkstra Curve Maximization strategy with three intermittent points.

27. The computational device according to claim 15, wherein said determinator is configured to utilize point-to-curve matching.

28. The computational device according to claim 15, further comprising an associator configured to associate an output weight to every normalized segmental and connective feature.

29. An apparatus comprising:
a pen movement capturing device configured to receive data representing a handwritten pattern;
a computational device according to claim 15 configured to receive said data from said pen movement capturing device and to output matching templates;
said computational device configured to match said templates into symbols; and
a display configured to present said symbols;
wherein said apparatus is a data handling device.

30. An apparatus according to claim 29, wherein said pen movement capturing device is a touch sensitive surface.

31. An apparatus according to any of claim 29 or 30, further comprising a symbol set database comprising a number of reference template data combinations and their associated symbols data.

32. A computer implemented method for recognition of a handwritten pattern comprising one or more curves, said method comprising:
receiving, by a computational device, sample data representing the handwritten pattern;
segmenting, by the computational device, the handwritten pattern by detecting segmentation points on each curve and by dividing the handwritten pattern into segments, wherein detecting segmentation points further comprises detecting the segmentation points as local extreme points which are below a predetermined threshold, such that a particular gradient function of the curve is exceeded; and
comparing, by the computational device, the handwritten pattern to templates wherein the comparing comprises:
normalizing, by the computational device, said segments according to a scheme which is independent of the templates to which the segments are to be compared, and
determining, by the computational device, matching measures for selecting at least one sequence of templates representing a recognition candidate of the handwritten pattern;
wherein said matching measures comprise segmental matching measures comparing segmental features of the handwritten pattern to segmental features of the templates; and
wherein said matching measures comprise for each pair of connected segments computing and using a length ratio and a connection angle and for each non-connected subsequent segments, computing and using a length ratio, a vertical position, and a segment gap.

* * * * *